United States Patent
Markam et al.

(10) Patent No.: US 12,406,301 B2
(45) Date of Patent: Sep. 2, 2025

(54) EARLY NETWORK GROWTH WARNING SYSTEM AND METHOD

(71) Applicant: MASTERCARD INTERNATIONAL INCORPORATED, Purchase, NY (US)

(72) Inventors: Shiv Markam, Mandla (IN); Rupesh Kumar Sankhala, Churu (IN); Bhargav Pandillapalli, Atmakur (IN); Aniruddha Mitra, Kolkata (IN); Akash Singh, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 75 days.

(21) Appl. No.: 17/749,912

(22) Filed: May 20, 2022

(65) Prior Publication Data
US 2023/0377038 A1    Nov. 23, 2023

(51) Int. Cl.
*G06Q 40/04* (2012.01)
*G06F 18/2137* (2023.01)
*G06N 3/044* (2023.01)
*G06Q 20/40* (2012.01)

(52) U.S. Cl.
CPC ....... *G06Q 40/04* (2013.01); *G06F 18/21375* (2023.01); *G06N 3/044* (2023.01); *G06Q 20/4016* (2013.01)

(58) Field of Classification Search
CPC ... G06Q 40/04; G06F 18/21375; G06N 3/044
USPC .......................................................... 705/35
See application file for complete search history.

(56) References Cited

U.S. PATENT DOCUMENTS

| | | | |
|---|---|---|---|
| 8,706,587 B1 * | 4/2014 | Bautista, Jr. et al. | 705/35 |
| 9,396,621 B2 | 7/2016 | Fan et al. | |
| 10,438,297 B2 * | 10/2019 | Han et al. | G06Q 40/12 705/30 |
| 11,403,643 B2 * | 8/2022 | Shekhar et al. | G06Q 20/4016 |
| 11,640,609 B1 * | 5/2023 | Shoumaker et al. | G06Q 20/4016 |

(Continued)

OTHER PUBLICATIONS

Irofti et al., Quick survey of graph-based fraud detection methods, Jan. 11, 2021, Department of Computer Science, University of Bucharest, Romania, https://arxiv.org/abs/1910.11299v3. (Year: 2021).*

(Continued)

*Primary Examiner* — Bennett M Sigmond
*Assistant Examiner* — George N. Proios
(74) *Attorney, Agent, or Firm* — Jordan IP Law, LLC (57) ABSTRACT

A growth predictor includes a monitor, a prediction engine, and a prioritization engine. The monitor receives or generates first information of a network already identified as a candidate money laundering (ML) network by an anti-money-laundering system. The prediction engine predicts second information indicative of a growth size of the ML network at a future time based on the first information. The prediction engine executes one or more predictive models to generate the second information indicative of growth size based on the first information, which indicates one or more changes that have occurred in the candidate ML network over a past period of time. The prioritization engine determines a priority of the candidate ML network based on the second information.

14 Claims, 9 Drawing Sheets

(56) References Cited

U.S. PATENT DOCUMENTS

2004/0138978 A1* 7/2004 Zhang et al. .................. 705/36
2018/0218369 A1* 8/2018 Xiao et al. ......... G06Q 20/4016
2019/0122140 A1* 4/2019 Sen .................... G06N 99/005
2019/0311367 A1* 10/2019 Reddy et al. ...... G06Q 20/4016
2022/0020026 A1* 1/2022 Wadha et al. ...... G06Q 20/4016

OTHER PUBLICATIONS

Michael Defferrard et al., "Convolutional Neural Networks on Graphs with Fast Localized Spectral Filtering", 30th Conference on Neural Information Processing Systems (NIPS), Dec. 2016, 9 pages, Barcelona, Spain.

Annamalai Narayanan et al., "graph2vec: Learning Distributed Representations of Graphs", Cornell University arxiv, <arxiv.org/pdf/1707.05005>, Jul. 17, 2017, 8 pages.

Jiani Zhang et al., "GaAN: Gated Attention Networks for Learning on Large and Spatiotemporal Graphs", Cornell University arxiv, <arxiv.org/pdf/1803.07294>, Mar. 20, 2018, 10 pages.

* cited by examiner

EARLY NETWORK GROWTH WARNING SYSTEM AND METHOD

FIELD

One or more embodiments described herein relate to systems and methods which use artificial intelligence to predict future risk in an application or network that facilitates criminal activity, including but not limited to money-laundering.

BACKGROUND

Money laundering refers to masking the illegitimacy of money derived from criminal activity, especially when that money is deposited or otherwise used in association with a bank, hedge fund, private equity firm, or other financial institution. Various techniques have been used by criminals to make money look like it was derived from legitimate revenue sources, at least from an accounting standpoint. Some of these techniques are very sophisticated, involving the use of trojans, malware, encryption, and other forms of complex data processing techniques.

In an attempt to identify laundered money and its associated parties, anti-money-laundering systems have been developed to flag suspicious accounts and networks. However, even when flagged, the accounts and networks often continue to be active and may even grow. Money laundering networks can grow in various ways. Examples include adding new accounts, performing new or a greater volume of transactions, and new sources and flows of money. Every new transaction or account added to a money laundering network increases the time and resource allocations by financial institutions and/or law enforcement used to investigate them. Moreover, the amount of money flowing in the networks results in additional costs and money losses.

SUMMARY

Embodiments described herein include a system and method for monitoring the growth of networks that facilitate illegal activity, including money laundering (ML) networks. Preemptive action may be taken to neutralize or otherwise combat the network and prevent the predicted growth of the network before the growth happens, or at least at an early stage of growth.

These or other embodiments perform growth monitoring using a prediction engine that uses one or more machine-learning models, predictive algorithms, or other forms of artificial intelligence to predict which already-identified candidate ML networks pose a high risk of growth in the foreseeable future.

These or other embodiments may use various logic to generate scores to identify candidate ML networks which the prediction engine indicated poses a high future growth risk.

These or other embodiment may prioritize the candidate ML networks based on the generated scores, so that the highest risk networks may be given priority by the fraud department of a financial institution and/or law enforcement agency for resolution.

These or other embodiments allow for the effective performance of anti-money-laundering (AML) techniques that target ML networks in a way that could not be realized without the predictive prioritization described herein.

These or other embodiments allow for a more efficient allocation of resources (e.g., time, manpower, costs, money loss, and/or other resources) of financial institutions and/or law enforcement for managing ML networks predicted to have high future growth risk.

In accordance with one or more embodiments, a growth predictor includes a monitor configured to receive or generate first information of a network already identified as a candidate money laundering (ML) network by an anti-money-laundering system; a prediction engine configured to predict second information indicative of a growth size of the ML network at a future time, the prediction engine to predict the second information based on the first information; and a prioritization engine configured to determine a priority of the candidate ML network based on the second information, the prediction engine to execute one or more predictive models to generate the second information indicative of the growth size of the ML network at the future time, the first information indicating one or more graphical changes that have occurred in the candidate ML network over a past period of time.

In accordance with one embodiment, a method for managing a financial network includes receiving or generating first information of a network already identified as a candidate money laundering (ML) network by an anti-money-laundering system; predicting second information indicative of a growth size of the ML network at a future time based on the first information; and determining a priority of the candidate ML network based on the second information, wherein said predicting includes executing one or more predictive models to generate the second information indicative of the growth size of the ML network at the future time, the first information indicating one or more graphical changes that have occurred in the candidate ML network over a past period of time.

DETAILED DESCRIPTION

Figure 1:
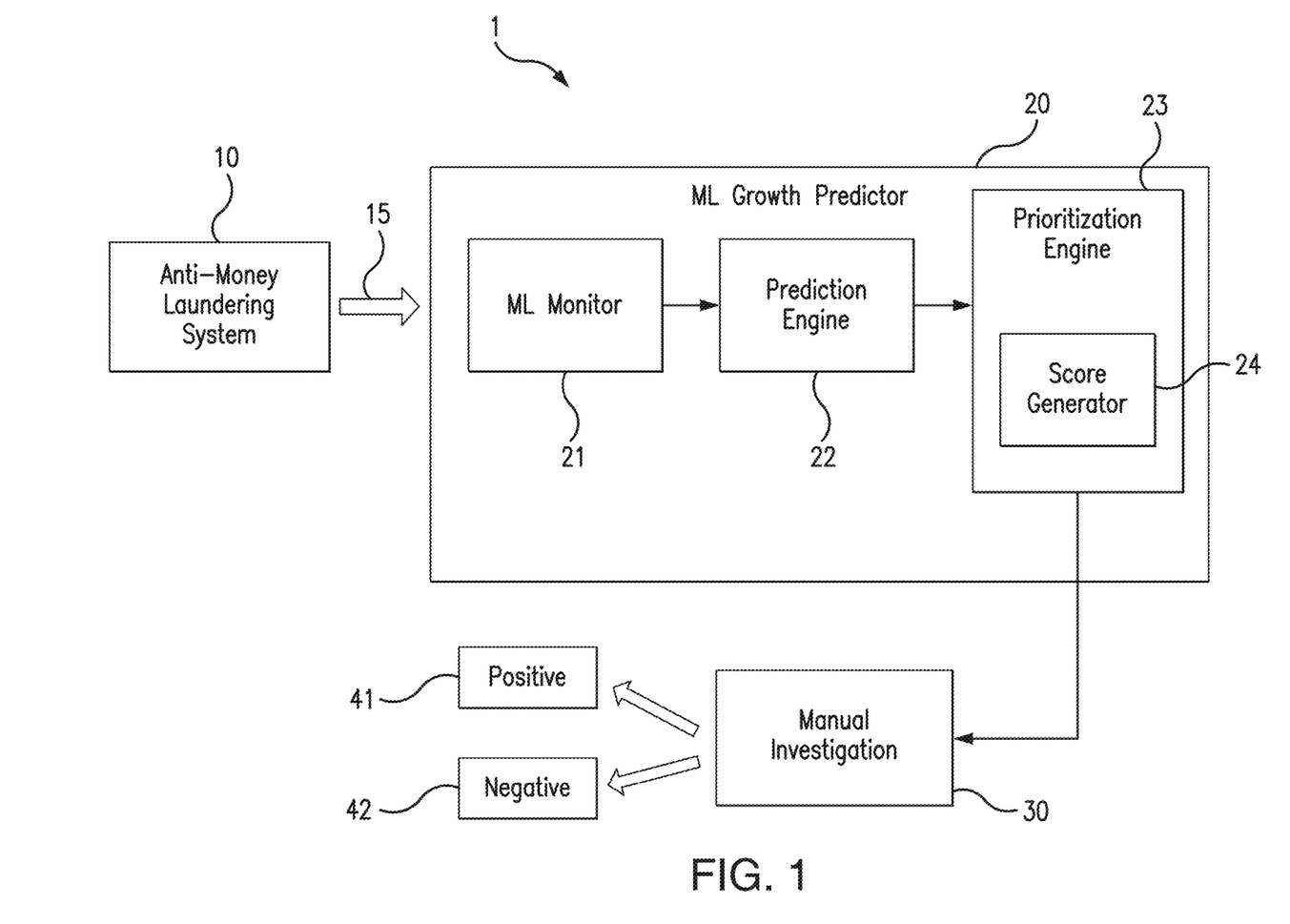
FIG. 1 shows an embodiment of a system for predicting the growth of one or more money laundering networks.

FIG. 1 shows an embodiment of a system 1 that may be used to predict the growth of one or more money laundering (ML) networks. The ML networks may be operating within or in association with a transactional network of at least one bank, hedge fund, private equity firm, credit union, credit card company, or other type of financial institution. The money laundering may be performed by a criminal enterprise, terrorist group, foreign government, or other entity participating in illegal financial transactions or account management. In accordance with one or more embodiments (described in greater detail below), the benefit of predicting which ones of a plurality of ML networks present a high future risk of growth and then prioritizing those networks based on the predicted risk may allow for anti-money laundering management to be performed more effectively before that growth occurs. This, in turn, may mitigate the costs or money losses that would otherwise accrue to the financial institution if anti-money-laundering techniques were employed without the embodiments described herein.

Referring to FIG. 1, the system 1 includes a money-laundering growth predictor that receives information from an anti-money-laundering (AML) system 10. The money-laundering growth predictor 20 may be implemented, for example, in a server or computer system of the financial institution and may be coupled to the AML system 10 either locally or through one or more wired or wireless networks.

A method of operating the system 1 in accordance with aspects of the present disclosure will be described in greater detail with reference to FIG. 2

Figure 2:
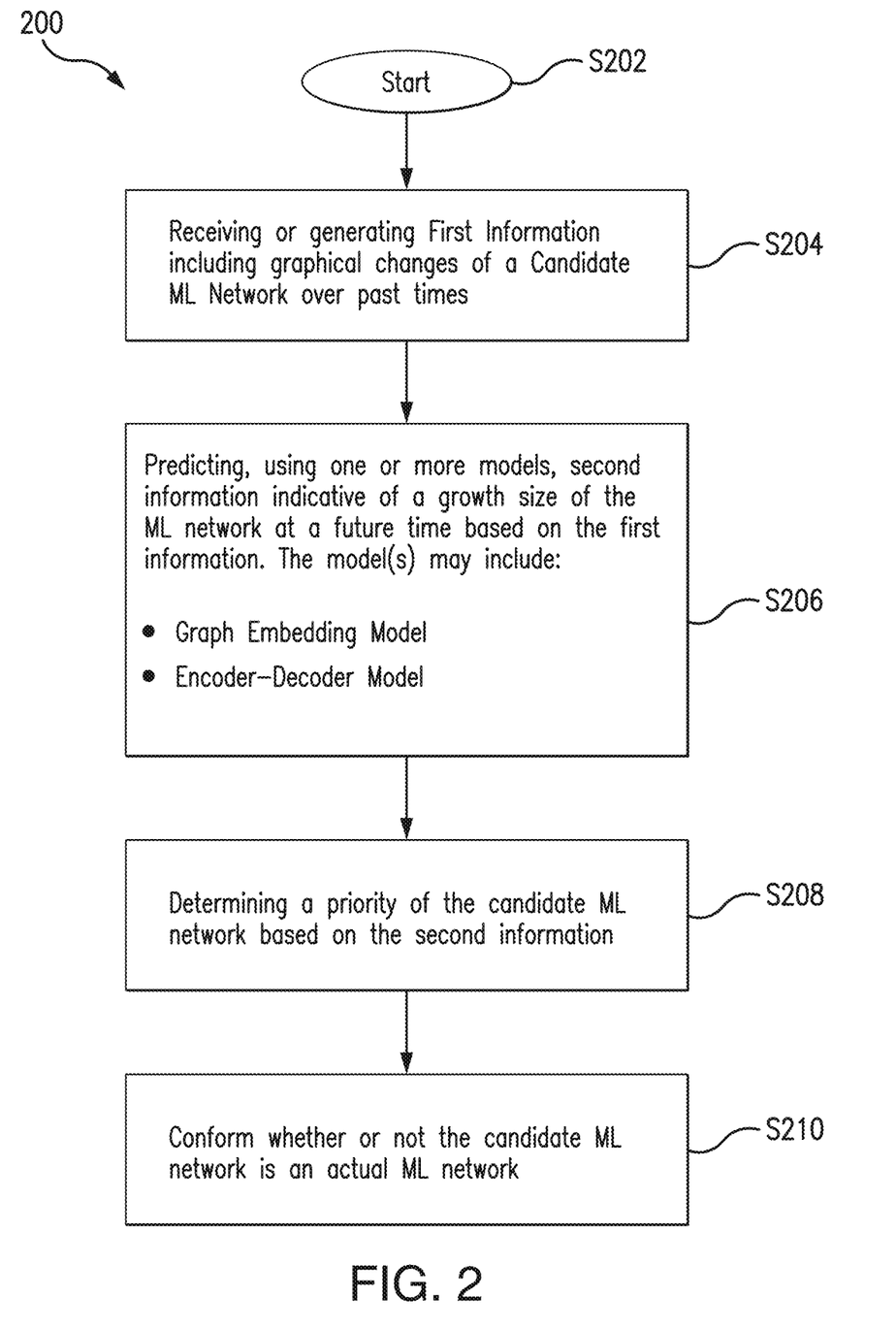
FIG. 2 shows an embodiment of a method for generating growth predictions of one or more candidate ML networks.

FIG. 2 illustrates a method 200 for generating growth predictions of one or more candidate ML networks. The predictions and other operations included in the method may be performed, for example, based on the ML growth predictor 20 of FIG. 1 along with the various embodiments of the prediction engine 22 of the ML growth predictor described herein for generating and prioritizing the candidate ML networks.

As shown in FIG. 2, method 200 starts (S202) and first information of a network already identified as a candidate money laundering (ML) network by an anti-money-laundering system is received or generated (S204). The first information may include one or more graphical changes that have occurred in the candidate ML network over a past period of time. For example, the graphical changes may include any of the versions of the time-series data (e.g., series of snapshot graphs) described herein. The first information may be received when, for example, the AML system 10 generates the time-series data and the ML monitor is omitted. The first information may be generated when the ML monitor generates the time-series data.

The AML system 10 may be any one of a variety of systems that generate information identifying candidate money-laundering networks within or otherwise associated with the network of the financial institution. Examples of AML systems that may correspond to AML system 10 include, but are not limited to, transaction monitoring systems, currency transaction reporting systems, customer identity management systems, malware systems, and other systems that implement various forms of transactional or account compliance software. In other embodiments, the AML system 10 may generate information identifying candidate ML networks using different methods or techniques.

Figure 3A:
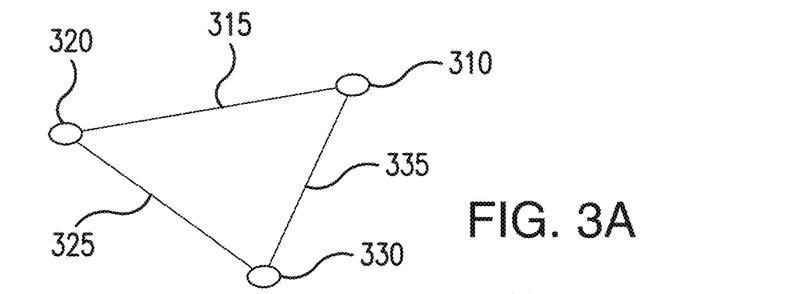
FIGS. 3A to 3E shows examples of different types of ML networks.
Figure 3B:
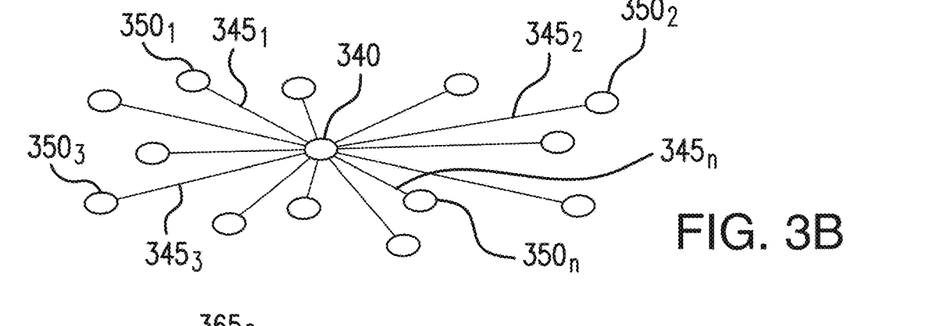
Figure 3C:
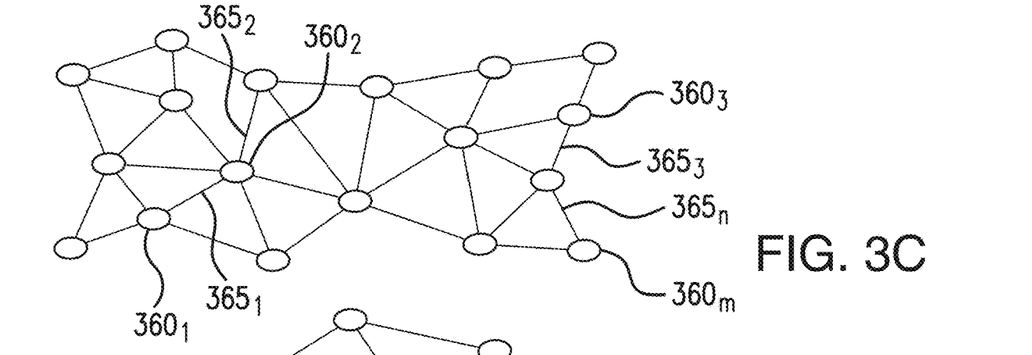
Figure 3D:
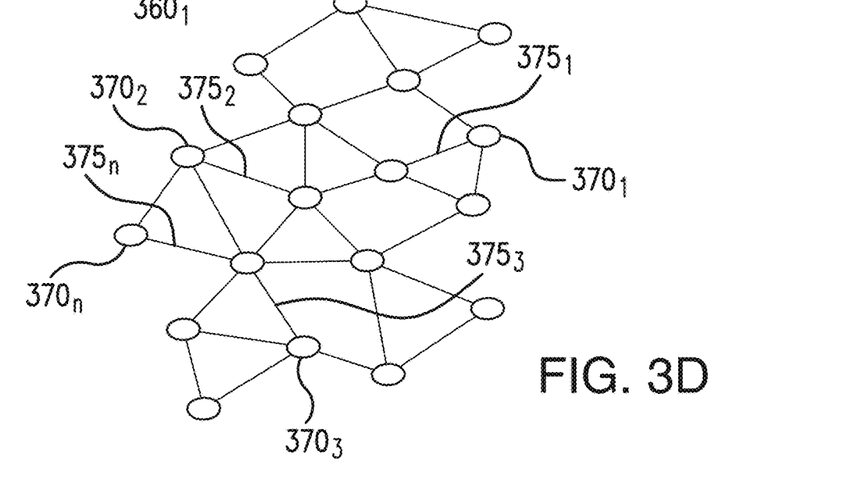

FIGS. 3A to 3D show examples of different types of ML networks that may be flagged by the AML system 10 to be a candidate money-laundering network. In FIG. 3A, three nodes 310, 320 and 330 are shown, which, for example, may represent accounts within the financial system. The lines 315, 325, and 335 may be referred to as edges that symbolize transactions taking place between and among the account nodes. Such a graph or mapping may constitute one type of ML network flagged by AML system 10. In FIG. 3B, a single account node 340 conducts transactions $345_1$, $345_2$, $345_3$, . . . , $345_n$ with multiple other account nodes $350_1$, $350_2$, $350_3$, . . . , $350_n$. Such a graph or mapping may constitute another type of ML network flagged by AML system 10. In FIG. 3C, a graph or mapping of account nodes $360_1$, $360_2$, $360_3$, . . . , $360_n$ with edges $365_1$, $365_2$, $365_3$, . . . , $365_n$ may form another, more complex type of ML network. Only some of the edges and nodes have been labeled with reference numerals in FIG. 3C, but each account node is coupled to multiple edges in this ML network. In FIG. 3D, an ML network is shown having another graph or mapping of account nodes $370_1$, $370_2$, $370_3$, . . . , $370_n$, each of which is coupled to multiple edges $375_1$, $375_2$, $375_3$, . . . , $375_n$ with between and among the nodes. Only some of the edges and nodes have been labeled with reference numerals in FIG. 3D. In addition to nodes and edges, the graphs or mappings may include indications of money flow and/or other ML network attributes. The types of ML networks in FIGS. 3A to 3D may be generated by AML system 10 using different models or a common model.

Figure 3E:
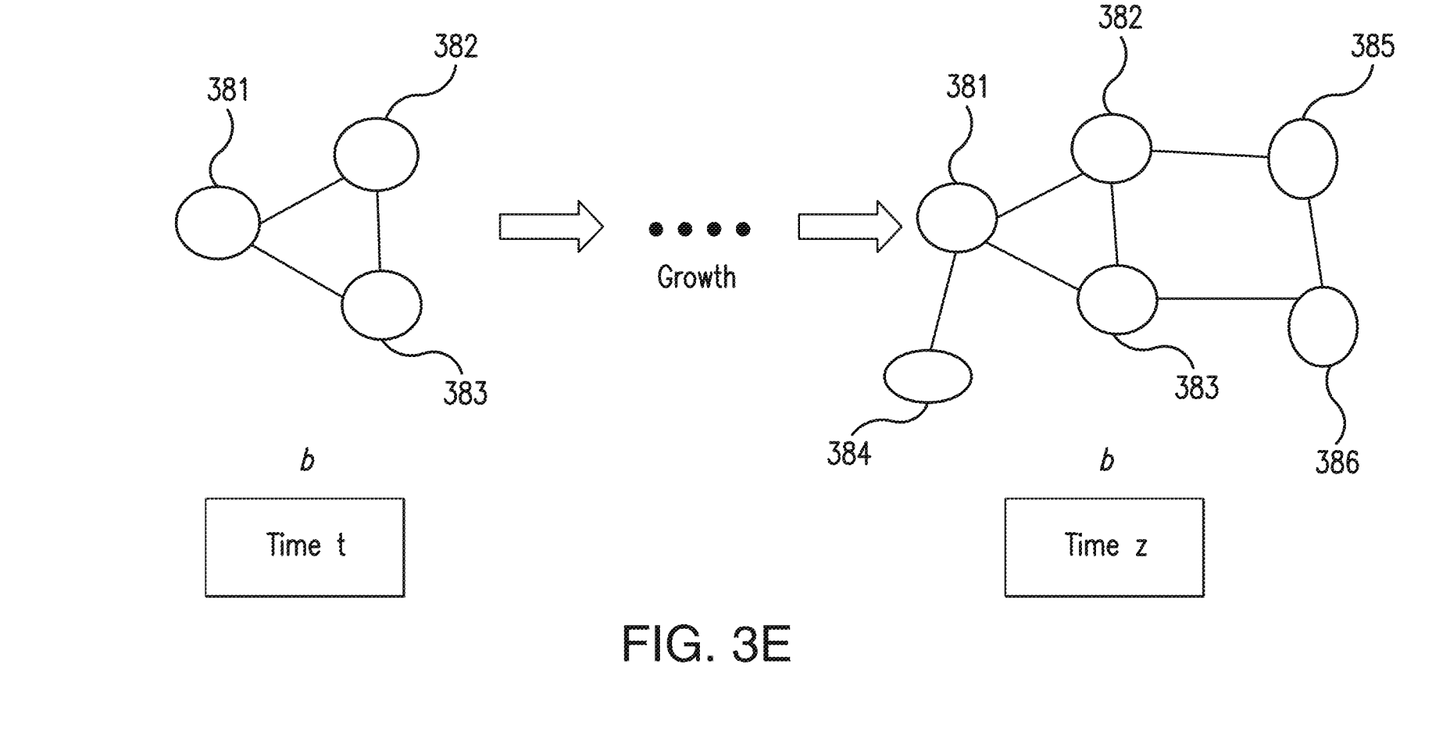

The networks flagged by AML system 10 as ML networks continue to evolve over time. Simply flagging them does not stop their growth. The growth may involve, for example, the addition of nodes, edges, money flow, and/or other network attributes, as well as a burgeoning number of financial transactions conducted within the ML network. A non-limiting example of how ML network growth may occur over time is set forth in FIG. 3E. At time t, the candidate ML network flagged by AML system 10 has three account nodes 381, 382, and 383 with corresponding edges (transactions). At time z, the network has six account nodes with the addition of nodes 384, 385 and 386 with corresponding edges. Thus, the candidate ML network has grown by three account nodes and many more transactions among the six nodes over the time period $\Delta t$=time z−time t. The growth pattern of FIG. 3E is just an example, as growth may occur in any of a variety of other ways. The addition of every node and edge increases the time and resources that must be expended by the financial institution and/or a law enforcement agency in an attempt to confirm the ML network and to deactivate, counter, or otherwise manage its illegal activity.

The AML system 10 may determine (or flag) the candidate ML networks, for example, on evolving basis as transactions, nodes, money flow and other financial activity and attributes of the network of the financial institution occur or change on a real-time and/or continuous basis. In other embodiments, the AML system 10 may determine the candidate networks on a periodic or event-driven basis.

The AML system 10 may use one or more machine-learning or neural network models to perform its flagging operation. In one case, the AML system 10 may determine candidate ML networks by implementing the Mule Insights Tactical Solution (MITS) used by Mastercard and developed at Vocalink in partnership with Pay.UK. The MITS system alerts financial institutions to suspect money laundering accounts within their own four walls, so they can act to avoid potential losses, fines and reputational risk. The MITS system also enables institutions to work together at industry level to shut down mule networks, disrupting fraud and money laundering which amounts to the loss of millions of pounds annually. The MITS system is just one example, and the embodiments described herein may be used with another AML system that generates information identifying candidate ML networks to be investigated and acted against.

Returning to FIG. 1, the money-laundering (ML) growth predictor 20 includes an ML monitor 21, a prediction engine 22, and a prioritization engine 23 implemented at least partially based on instructions executed by a controller of the ML growth predictor 20. The instructions may be stored in a storage area coupled for access by the controller, which, for example, may be implemented by one or more processors. An example of a control system with such a controller is discussed in greater detail below.

The ML growth predictor 20 receives information 15 from the AML system 10, which, for example, may correspond to an input of the ML growth predictor 20. The information 15 may include data of one or more flagged accounts in the financial network that have already been flagged by the AML system 10 as being candidate ML networks, e.g., which may be otherwise referred to ML network data. In one embodiment, the information is sequentially received by the ML growth predictor 20 over time.

The ML monitor 21 may generate time-series data based on information 15 for each network that has been flagged as a candidate ML network by AML system 10. For illustrative purposes, one candidate ML network will be considered with the understanding that like operations may be performed for other networks that have been flagged as ML network candidates. In operation, the ML monitor 21 may generate snapshots of the candidate ML network corresponding to information received from the AML system 10. The snapshots may include the state of the ML network at different time points, which are either continuously or discretely related to one another. The state indicated in each snapshot may be represented by a graph or mapping, for example, similar to the graph or mappings of the ML networks shown in FIGS. 3A to 3D or may be represented by a different type of data in another embodiment.

Figure 4:
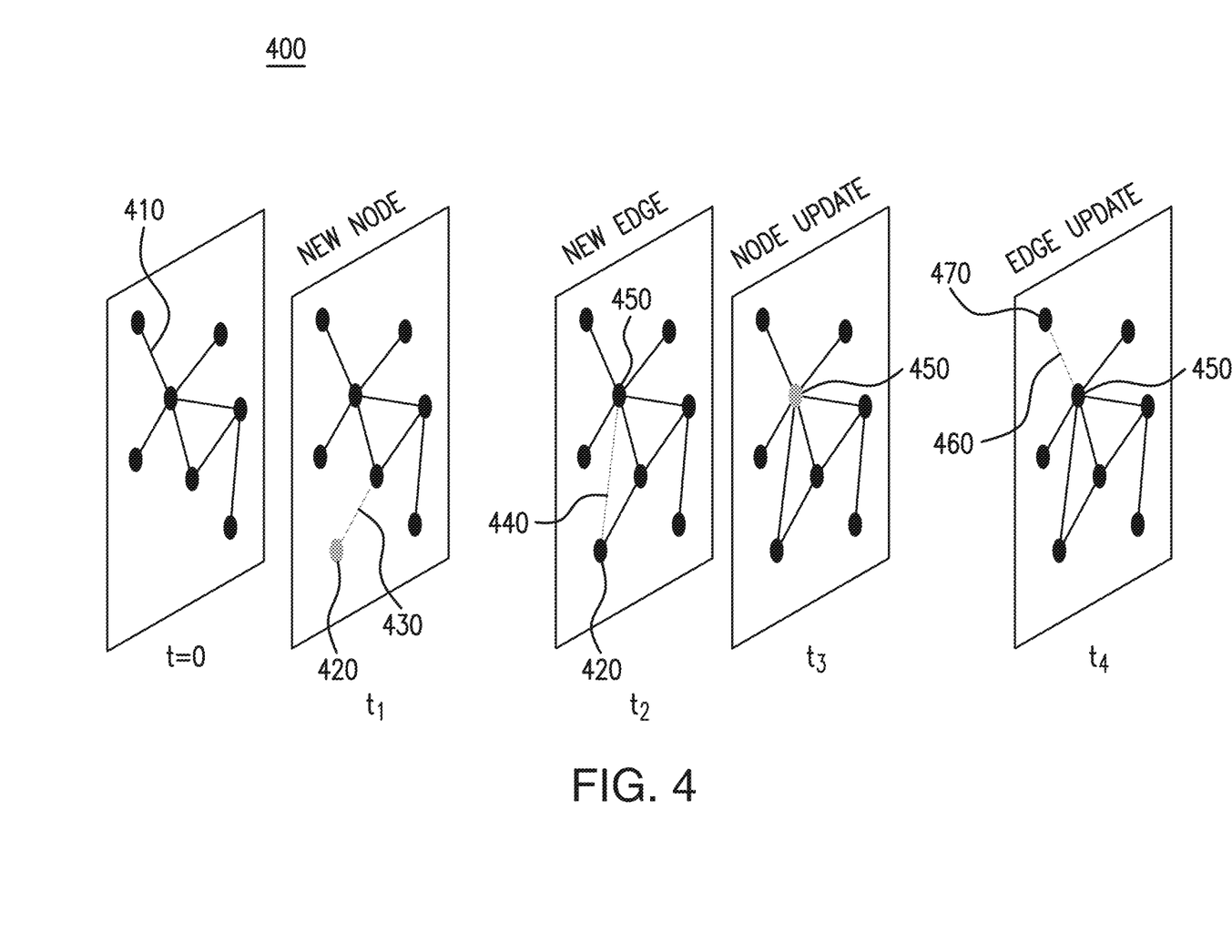
FIG. 4 shows an example of time-series data of a candidate ML network.

FIG. 4 shows an example of time-series data 400 which may be generated (for example, in graphical form) by the ML monitor 21 in accordance with one embodiment. In this example, the state of the suspected ML network is shown over a series of five time points $t_0$ to $t_4$. As shown, the ML network 410 changes over time. The change occurs in various ways. At time $t_1$, network 410 has changed to include an additional account node 420, with one or more transactions (edges), an example of which is illustrated as edge 430, occurring between that node and another node in the network. At time $t_2$, network 410 has changed by adding an edge 440 indicative of one or more transactions taking place between existing account nodes 420 and 450. At time $t_3$, network 410 has changed again through an update of account node 450. And, at time $t_4$, network 410 has changed again through an update of transaction edge 460 between account node 450 and account node 470.

In FIG. 4, the time increments between adjacent ones of the snapshot graphs may be the same time or may be different times. If different, the snapshots may correspond to only those over a continuous time period where a significant change has occurred to the suspected ML network 410, as determined, for example, by the ML monitor 21 or as received from the AML network 10. The types of changes in network 410 indicate instances of network growth or evolution over time. If, indeed, network 410 is determined to be an actual ML network instead of just a candidate ML network as is the case at this point in the system, then the growth (or other change) of the network may cause serious damage to the overall network of the financial institution within which the ML network is operating, not to mention that the ML network would continue to be used for criminal activity. In other embodiments, the change in network 410 over time may include, for example, some account nodes disappearing (or otherwise rendered inactive) and other account nodes appearing in the network. These situations may also be considered to be growth in accordance with one or more embodiments. Other types of changes relating to money flow, account nodes, transactions between and among the nodes, etc., may also be included.

In one embodiment, the ML monitor 21 may observe the changes in the candidate (or suspected) ML network over time and perform a filtering function. For example, if the ML monitor 21 determines that the ML network has become inactive or reduced in size or that some other change has occurred which diminishes the probability of the network being an ML network, then the ML monitor 21 may not output information to the next stage, which may be the prediction engine 22. For example, the number and/or type of changes observed by the ML monitor 21 may be compared to corresponding thresholds. If one or more of the thresholds is exceeded over a predetermined period of time, the ML monitor may input information corresponding to the ML network to the prediction engine. Conversely, if one or a combination of thresholds is not exceeded, the ML monitor 21 may filter out that network by not forwarding its information for consideration by the prediction engine. In some cases, the AML network 10 may output the time-series data in graphical form, for example, as shown in FIG. 4 or otherwise in a format compatible with the prediction engine 22. In this case, the ML monitor 21 may be considered an optional feature and thus, for example, information 15 may be input directly into the prediction engine 22 and/or the ML monitor 21 may be omitted.

Returning to FIG. 2, after first information of a network already identified as a candidate money laundering (ML) network by an anti-money-laundering system is received or generated (S204), second information indicative of a growth size of the ML network at a future time is predicted based on the first information (S206).

The predictions of growth size may be performed, for example, using any of the machine-learning algorithms, models, or other forms of artificial intelligence described herein. The prediction may be made for one or more future times based on the history of activity of the candidate ML network. Growth may be expressed or determined in terms of changes in the number or type of account nodes, changes in the number of type of edges representing transactions between and among the account nodes, changes in money volume, changes in money flow, and/or any of the various other types of growth changes that may take place within the candidate network and for which the prediction model(s) are configured to determine.

The prediction engine 22 uses artificial intelligence to predict the probable growth of a candidate ML network at least in the foreseeable future. The prediction is generated based on the time-series data (e.g., snapshots) output from the ML monitor 21. By recognizing and processing patterns and/or other indicia relating to the evolution of the network over a past time period (e.g., times $t_0$ to $t_4$ in the case of network 410 in FIG. 4), the prediction engine 22 may predict, for example, where the ML network is likely to grow. If so, the prediction engine 22 may further predict various aspects of the growth in the network that is likely to occur at a future time, e.g., hours, days, or months to come. These aspects may include, but are not limited to, the rate of potential growth and how that growth is likely to occur (e.g., increase in the updating and/or addition of account nodes, increase or updating of the transactions (edges) among the account nodes, money flow, etc.) based on the time-series of the candidate ML network.

The prediction engine 22 may predict growth of the ML network using various types of artificial intelligence. Examples include machine-learning models, neural networks, and/or a combination of these. The type of artificial intelligence used may determine the accuracy of the growth prediction in certain circumstances. So, the efficacy of the models and algorithms may not be considered equal to one another. Example embodiments of the artificial intelligence used by the prediction engine 22 are described in detail below.

Returning to FIG. 2, after second information indicative of a growth size of the ML network at a future time is predicted based on the first information (S206), a priority of the candidate ML network is determined based on the second information (S208).

The priority may be determined, for example, by generating a score using the score generator previously discussed. For example, the score generator may generate a score indicating the severity of the potential risk each ML network poses to the financial network and/or its participants relative to other candidate ML networks or taken alone based on a predetermined score range or scale. The severity may be measured in terms of the future growth size of the ML network predicted by the prediction engine 22. For example, candidate ML networks that pose a greater risk (e.g., a great potential future size) may be assigned a larger score.

In one embodiment, scores may be generated based on one or more predetermined criteria relating, for example, to predicted growth size, types of accounts, identity of account owners, numbers and/or types of transactions that currently exist and are predicted to take place in the ML network, the rate and/or type of growth predicted to occur, and/or other criteria.

The prioritization engine 23 may determine a priority for each candidate ML network based on the growth information output from the prediction engine 22. In one embodiment, the prioritization engine 23 may determine a priority for each candidate ML network using a score generator 24. The score generator may generate a score indicating, for example, the severity of the potential risk each ML network poses to the financial network and/or its participants based on the future growth size predicted by the prediction engine 22. For example, candidate ML networks that pose a greater risk (e.g., a great potential future size) may be assigned a larger score.

In one embodiment, the score generator 24 may generate scores based on one or more predetermined criteria relating, for example, to predicted growth size, types of accounts, identity of account owners, numbers and/or types of transactions that currently exist and are predicted to take place in the ML network, the rate and/or type of growth that is predicted to occur, and/or other criteria.

In one embodiment, the score generator 24 may use a weighting scheme to generate a score for each candidate network. The weights may be assigned, for example, to emphasize, or deemphasize, various attributes of the network considered to be of particular interest to the financial institution and/or law enforcement. For example, in some cases candidate ML networks with a greater predicted growth size may be given a greater weight than others with a smaller predicted size. Additionally, or alternatively, weights may be assigned on the basis of growth rate instead of growth size. In these or other cases, greater weights may be assigned for ML networks predicated to have a greater number of account nodes, over ones that do not have as many predicated account nodes.

In other embodiments, candidate ML networks with a greater number of transactions may be given a higher weight, even in cases where the number of account nodes is less than other candidate ML network with a greater number of account nodes but not as many transactions.

In another embodiment, the weights may be assigned according to account ownership (e.g., by parties known to have suspect backgrounds or a history of criminal activity), by geographical origination and/or destination of account nodes, and/or other network attributes. An example of how a weighted score may be generated is given by Equation 1:

$$\text{Score} = w_1 A_1 + w_2 A_2 + \ldots + w_n A_n \quad (1)$$

where w corresponds to the weight assigned by the score generator for a given one of n network attributes A. In one embodiment, the score may be generated based on a single attribute (n=1) or the score may be generated for multiple attributes where n>1.

Returning to FIG. 2, after a priority of the candidate ML network is determined based on the second information (S208), it is confirmed whether or not the candidate ML network is an actual ML network (S210). The score and/or other information corresponding to the candidate ML network received and/or generated by the ML growth predictor may be output to a predetermined system or entity. If confirmed as an actual ML network, additional action may be taken to combat or nullify the ML network, at least in respect to its operating and/or associated with the network of the subject financial institution.

The prioritization engine 24 may output information that prioritizes the candidate ML networks based on their scores. For example, the prioritization engine may rank the candidate ML networks based on score and output the ranking along with the predicated growth and other attributes and information predicted for each ML network by the ML growth predictor 20.

In one embodiment, the prioritization engine may not include a score generator but rather may use a graph neural network to predict the future size of flagged networks. The future size may be expressed, for example, in terms of numbers of accounts, number of transactions, or total volume and/or amount. For example, if there are 100 networks that are flagged as candidate ML network to be investigated, the graph neural network may output the future size of each of the networks. Then, the ML networks may be ranked in order based on predicted size.

The output of the ML growth predictor 20 may be output to one or more designated systems and/or entities. The output may include various types of information including, but not limited to, an identifier of the candidate ML network and information indicating the account nodes, transactions, money flow, score generated by the score generator 24, and priority information as indicated by the prioritization engine 23. In one embodiment, the output of the ML growth predictor may be electronically transmitted to one or more individuals of the concerned financial institution and/or a law enforcement agency for investigation 30. The investigation may include individuals performing research based on the information output from the ML growth predictor to confirm that the candidate ML network is an actual money-laundering network in which illegal activity is occurring. In another embodiment, the information output from the ML growth predictor may be input into a software-based tool for further analysis, including, for example, obtaining additional information that would allow for confirmation of the candidate ML network as an actual ML network by manual or a model-implemented investigation. The result of the investigation may include one of two indications, a positive indication 41 indicating a confirmation of the candidate ML network or a negative indication 42 indicating that the candidate ML network is not an actual money-laundering network. In some embodiments, the ML growth predictor 20 may automatically output an indication to an entity, wherein the output indicates that the candidate ML network is an actual money-laundering network in which illegal activity is occurring based on the ML growth predictor.

The prediction engine 22 may be implemented in various ways to generate a prediction as to the growth of a candidate ML based on the time-series data (e.g., snapshots) output from the ML monitor 21. Examples of some of these ways and the artificial intelligence used is discussed below.

Graph-Embedding Model

In one embodiment, the prediction engine 22 may implement one or more graph-embedding algorithms to predict the growth of the candidate ML network. The algorithm(s) may be stored in the form of instructions in a memory to be executed by the one or more processors of the controller that is described later.

Figure 5:
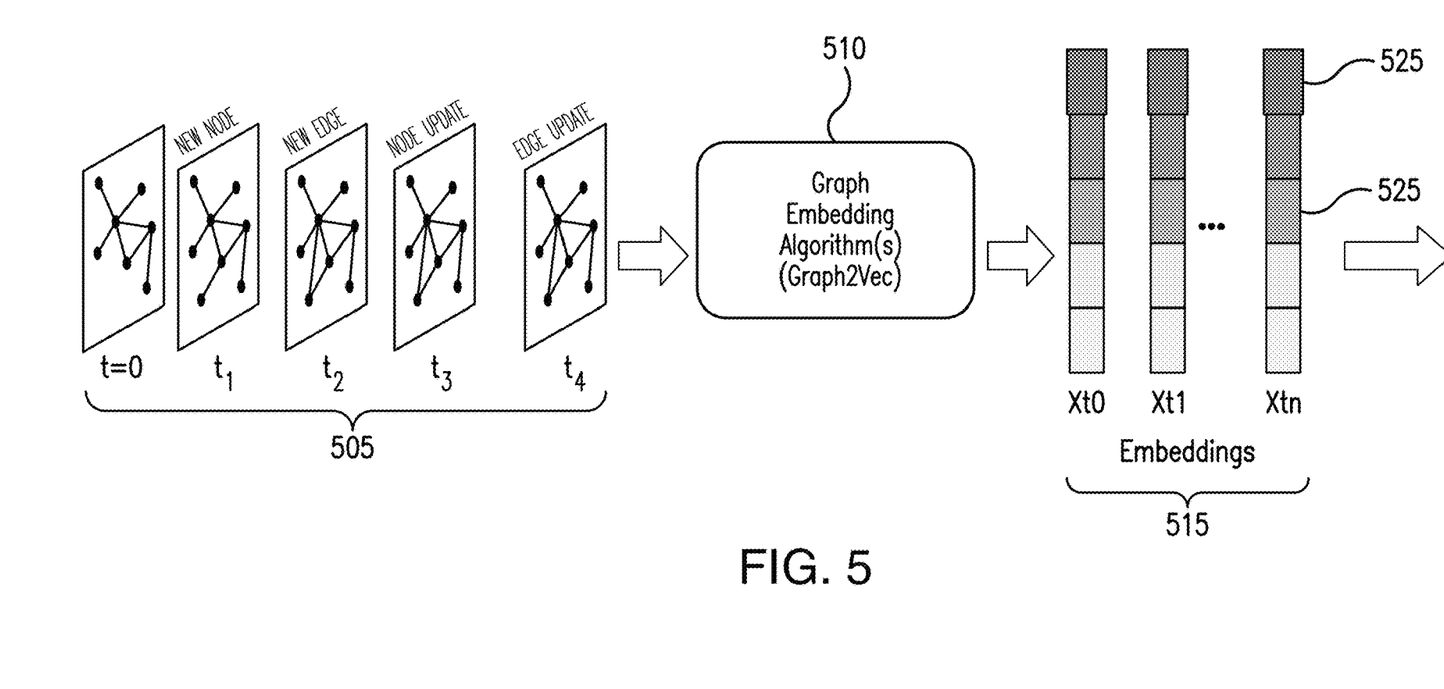
FIG. 5 shows an embodiment of a prediction engine module that performs one or more graph-embedding algorithms.

FIG. 5 shows an embodiment of the prediction engine 22 implemented with a Graph Embedding Module (GEM) 510 that performs one or more graph-embedding algorithms. For example, the time-series data 505 received from the ML monitor 21 may include a series of snapshots of the candidate ML network over time, as previously explained. The account nodes, edges, and/or other attributes of this network may effectively form a graph or mapping of the candidate ML network at the time t corresponding to each snapshot.

Once the embedding algorithm(s) generate embeddings 515 for the time-series data of the candidate ML network for past times t, the GEM 510 may predict growth of the ML network for a future time period. In one embodiment, the GEM 510 may perform this prediction using a neural network implemented based on the transformation function based on Equation 2:

$$Y_{t_n}=F(x_{t(n-1)},d(t_n-t_{n-1}),Y_{t(n-1)}) \quad (2)$$

where $Y_{t_n}$ corresponds to the size of the candidate ML network at time $t_n$ and F represents the transformation function of a feed-forward neural network. The neural network F generates an indication of the size of the candidate ML network as a function of three variables (in this embodiment): $x_{tn-1}$ corresponding to the embedding in the previous snapshot time $t_{n-1}$, $d(t_n-t_{n-1})$ which represents a change in the time between the current snapshot and the previous snapshot, and the size $y_{n-1}$ of the ML network at the previous time $t_{n-1}$.

In one embodiment, the GEM 510 may perform the prediction using a neural network implemented based on the transformation function based on Equation 3:

$$Y_{t2}=F(X_{t1},\Delta t,Y_{t1}) \quad (3)$$

where F is the feed-forward neural network and $\Delta t=t_2-t_1$.

The approach based on Equation 2 may be different from the approach based on Equation 3 in several respects. For example, the approach taken based on Equation 3 represents a feed forward neural network that can predict the size ($Y_{t2}$) of the ML network at time $t_2$, given the inputs: size ($Y_{t1}$) of the graph at time t1, graph embedding ($X_{t1}$) at time $t_1$, and the delta between the two times ($t_2-t_1$). This neural network will allow us to predict the future size of the network at any time if we have the size and embedding of the current network.

The approach taken based on Equation 2 is an auto-regressive/recursive function, where the network size is predicted one timestep at a time. In one embodiment, one timestep may be of a pre-determined scale as set in advance, e.g., 1 week, 1 month, etc. Thus, if the network size is known at time $t_1$ and the size at time $t_{10}$ is to be predicted, first the size at time $t_2$ is predicted. Then, the predicted size at $t_2$ is used as an input to predict the time at $t_3$, and so on, until time $t_{10}$ is reached. Thus, Equation 2 may be rewritten as Equation 4:

$$Y_{t+1}=F(X_t,Y_t) \quad (4)$$

Thus, the main difference between the two approaches is that the approach taken based on Equation 3 can predict the size at any arbitrary time period in one shot, whereas the approach based on Equation 2 (or Equation 4) can predict the size at next time step. In this latter, case, additional iterations must be performed for each timestep in order to determine the size at desired time period.

Thus, consider the case where n=1 to n=4 correspond to past times in the time-series data 505 and it is desired to know the size of the candidate ML network (and thus how much the candidate ML network is likely to grow) at a future time $t_{10}$, where n=10. In this case, Equation 1 may be rewritten as Equation 5:

$$Y_{t_{10}}=F(x_{t9},d(t_{10}-t_9),y_{t9}) \quad (5)$$

In the case of Equation 5, the size $Y_{t_{10}}$ of the ML network at future time $t_{10}$ may be generated based on the embedding $X_{t9}$ predicted by the model at future time t9, the change (or growth) taking place in the network between predicted time $t_{10}$ and predicted time t9, and the size of the network at predicted time t9. Effectively then, the size $Y_{t_{10}}$ is determined based on a comparison of size predictions at times $t_9$ and $t_{10}$. The sophistication and accuracy of the output generated by the GEM 510 allows this growth prediction to take place and thus allows for a way of performing early detection of ML networks, which, in turn, may allow earlier action to nullify or combat such networks to prevent significant loss and elimination of the associated criminal activity.

In one embodiment, the mapping performed by the GEM 510 may involve an embedding of the graph of the ML network to a low-dimensional space (e.g., Graph2Vec), where the graph may be viewed as including a plurality of vectors comprising the account nodes, edges, money flow, and/or other features of the candidate ML network incorporated in the time-series data output from the MI, monitor 21.

Using the GEM 510, two approaches may be taken for predicting the future size of a graph network. The first approach is represented by FIG. 5 and Equations 2 and 3, as explained above.

The first step of this approach includes learning embeddings of a graph using the GEM 510. It takes as input, different snapshots of graph networks and outputs an embedding (e.g., vector representation) of the graph, as depicted in FIG. 4. The second step includes using the current graph size and embedding to predict the future size of the graph using a feed forward network. This is represented by Equation 2. Thus, in the first approach, the GEM 510 is used to learn graph embeddings.

An example of a graph embedding model algorithm which may be used to implement the GEM 510 is set forth in "graph2vec: Learning Distributed Representations of Graphs", by Annamalai Narayanan et al., Nanyang Technological University, Singapore, at https://arxiv.org/pdf/1707.05005.pdf, the contents of which are incorporated by reference herein in its entirety. According to this algorithm, the following may be defined:

G={G1, G2, . . . Gn} denote the set of graphs for which embedding is to be learned Each graph Gi is represented as Gi=(Ni, Ei, Li) where Ni=set of nodes, Ei=set of edges, Li=set of unique labels for each node in graph Each graph Gi can be decomposed as the set of rooted subgraphs of degree d of all nodes Ni in Gi. A d-degree rooted subgraph of node n is a graph containing all the d hop neighbours of n. There exists a unique labeling (Weisfeiler-Lehman Labeling) for each such subgraph which gives an integer representation of the subgraph. To learn embeddings, we treat a graph as a document and the subgraphs as the vocabulary. This facilitates learning of graph embeddings similar to word/document embeddings in NLP.

We are interested in learning a matrix E of size |G|*D, where |G| is the number of graphs, and D is the dimension of embedding to be learned. Row i of matrix E represents the embedding/vector representation of graph Gi n_epochs=no. of epochs/iterations of the learning algorithm E is initialized with random values at the start The learning algorithm may be performed according to the following logic:

For e=1 to n_epochs do:
    For each graph Gi
        For each node n in Ni do:
            Get all subgraphs of degree-d rooted at node n
            Use skipgram algorithm with negative subsampling to train the model The output of the model is the matrix E with learned graph embeddings.

Figure 6:
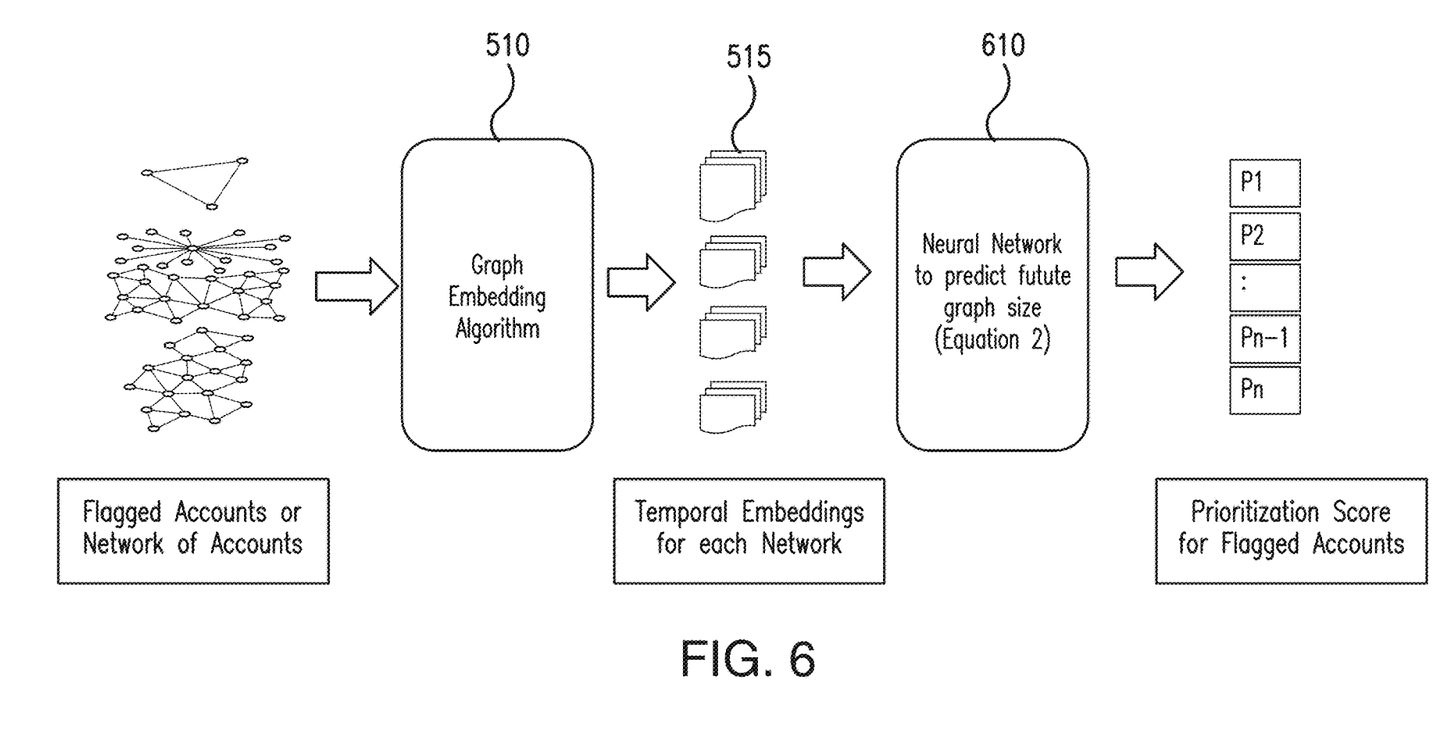
FIG. 6 shows an embodiment of a prediction engine module that performs graph-embedding algorithms with a neural network.

The above logic is additionally explained in greater detail with reference to FIG. 6. FIG. 6 uses the GEM 510 to output the graph embeddings. FIG. 6 shows how the embeddings are inputted to a neural network to predict the future graph size. As shown in FIG. 6, in operation, the GEM 510 generates temporal embeddings for each candidate ML network 515 based on the candidate flagged accounts and/or the candidate ML networks of accounts 501. The neural network 610 then processes the temporal embeddings output from the GEM 510 to predict the future graph size of the candidate ML networks. In this embodiment, the neural network predicts the future sizes of the graphs based on Equation 2, as previously described. The output of neural network 610 is used by the prioritization engine 23 as a basis to generate scores P1, P2, ... Pn–1, Pn for each of n candidate ML networks.

As shown in the figure, flagged AML networks are identified. For each AML network, its snapshots are taken at different respective times. Each snapshot represents that network at a different respective point in time. Thus representing the growth of the network over time.

The snapshots are passed to the GEM 510, which generates temporal embeddings 515 of the networks. The temporal embeddings 515 are inputted to a feed forward neural network 610. The outputs from the feed forward neural network 610 represent the future size of the networks. The feed forward neural network 610 by $Y_{t2}=F(X_{t1}, \Delta t, Y_{t1})$ Returning to FIG. 5, the embeddings $X_{t0}$ to $X_{tn}$ generated by the GEM 510 are shown over a series of past times beginning at t=0 to up to one or more future times, with the last future time in this example corresponding to t=tn. Thus, FIG. 5 shows that graphs 505 representing the same ML network at different timestamps are taken and passed through the GEM 510. The output is the corresponding graph embeddings 515 of the ML network at different time stamps. The shaded blocks in 425 represent a vector having different values at different positions.

In one embodiment, the graph size (Y) generated based on Equation 2 may be adjusted to emphasize different attributes of the graph (or embedding) corresponding to each past and future time. An example of these graph attributes include, but are not limited to, the number of account nodes in each graph, the number of edges (corresponding to transactions predicted to take place) bet Ten and among the account nodes, and a total edge weight which, for example, may be indicative of the total transaction volume taking place in the candidate ML network at the time corresponding to the snapshot.

Once the embeddings are generated along with their predicted sizes at the one or more future times, the prediction engine 22 outputs information that provides an indication of the predicted growth of the candidate ML network. The prioritization engine 23 may then generate a score indicating the importance or severity of risk posed by the ML network and then assign a priority to the ML network in relation to other candidate networks under consideration.

Figure 7:
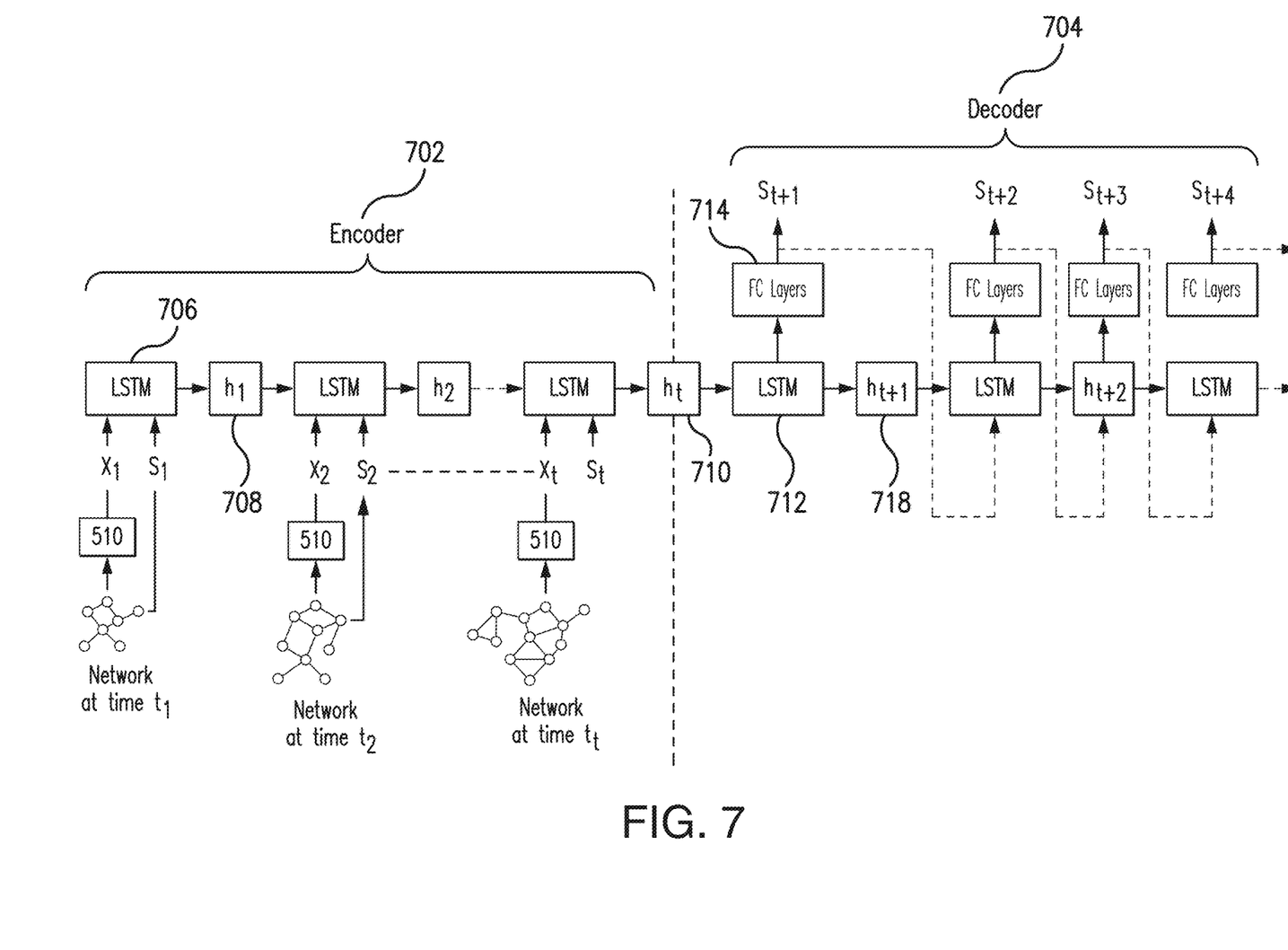
FIG. 7 shows an embodiment of a prediction engine which implements an encoder-decoder architecture to model future snapshots of the graph, as a way of predicting ML network size and thus growth.

The embodiment illustrated in FIG. 7 uses an Encoder-Decoder network to model network growth. The GEM 510 discussed above with reference to FIG. 5 provides a learned representation of the network structure. These network embeddings are used as input to Long Short Term Memory units (LSTMs) to model the growth of network over time.

The encoder module 702 takes the network embedding (x t) and network size (s t) at a given time at steps. The network embedding is obtained from the GEM 510. The encoder module uses LSTM units as the main block, a sample of which is indicated as LSTM 706. As the model is trained, the embedding module networks learn how the network evolves over time. This knowledge is encapsulated in the LSTM hidden state ($h_t$), a sample of which is indicated as 708. The last LSTM unit of the encoder module 702 passes the hidden state ($h_t$) to the decoder module 704.

The decoder module 704 runs in an auto-regressive manner and outputs the network size at next time step ($s_{t+1}$). The output at one timestep is used as the input at next timestep. Thus, the decoder module 704 can be used to predict the size for the desired timesteps, one step at a time. The timestep may be any predetermined time step, non-limiting examples of which include days, weeks, months, etc. The decoder module 704 receives the last hidden state ($h_t$) indicated as 710 from the encoder module 702. This goes as input to an LSTM 712. The output of the LSTM 712 is fed to a fully connected (FC) layer (a single layer feed forward neural network) 714 and outputs the size of the network. The hidden state, indicated as item 718, of the first decoder LSTM 712 is passed to the next LSTM block. These steps are repeated for as many time steps as required.

The encoder decoder model uses the following equations:

Encoder LSTM $$a_t = W^* h_{t-1} + U^* x_t + V^* s_t$$

$$h_t = \tanh(a_t)$$

Decoder LSTM $$h_t \tanh(W1^* h_{t-1} + V1^* s_t)$$

$$s_{t+1} = F(h_t)$$

where W, U, V are the weight matrices for $h_t$, $x_t$ and $s_t$ respectively in the encoder 702, and where W1, V1 are the weight matrices for the $h_t$ and $s_t$ respectively in the decoder 704.

Figure 8:
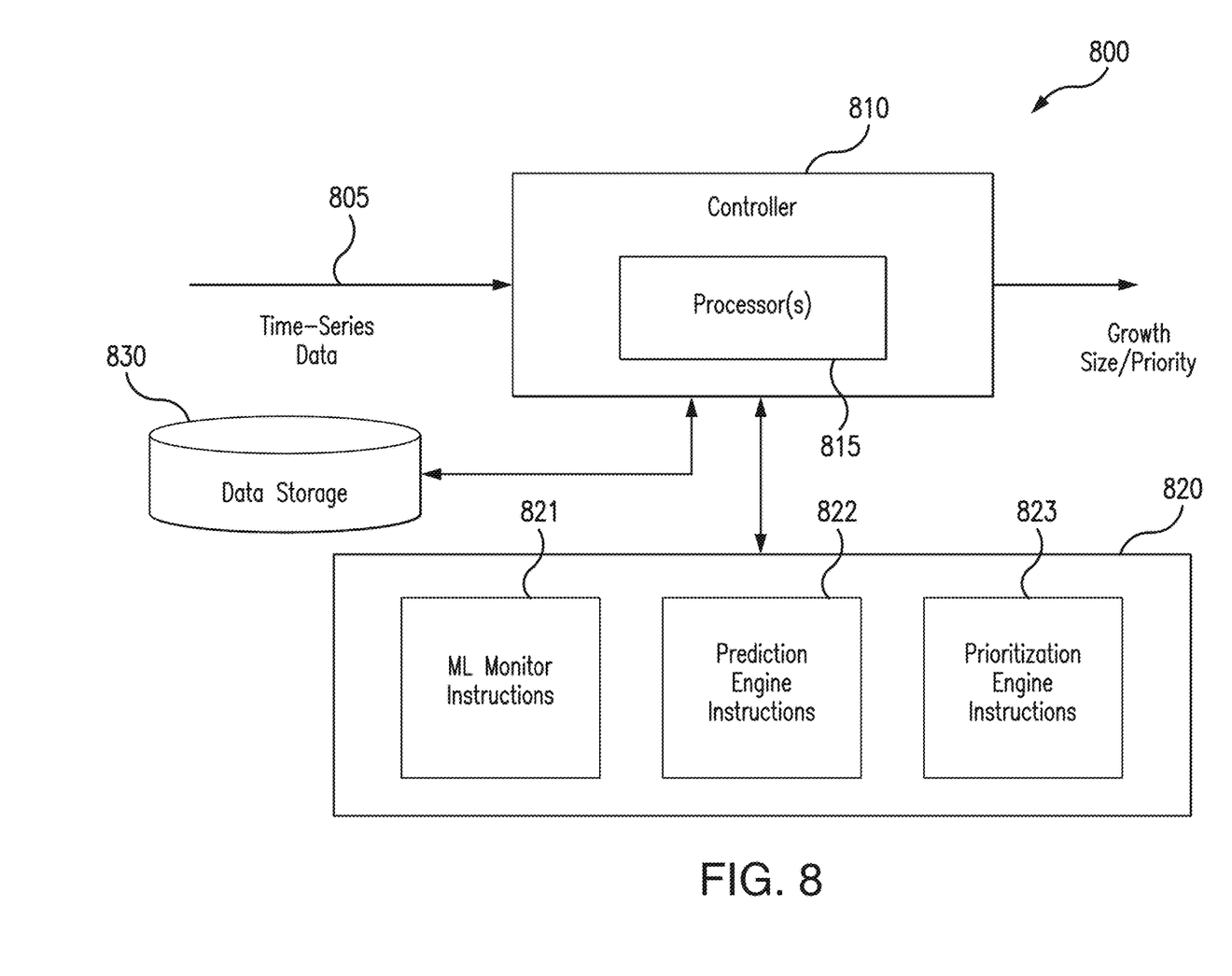
FIG. 8 shows an embodiment of a processing system which may be used to implement the various embodiments of the system.

FIG. 8 shows an embodiment of a processing system 800 which may be used to implement the various embodiments of the ML growth predictor. This system includes a controller 810 which receives any of the types of time-series data 805 previously discussed. In operation, the controller 810 executes instructions to perform the operations of the various embodiments of the ML growth predictor 20, including the various forms of artificial intelligence (AI) discussed.

The instructions may be stored in a memory 820 for execution by the controller. In one embodiment, the controller may have one or more processors 815 for executing the instructions. The instructions may include instructions used to implement the operations of the ML growth predictor 20. For example, a first set of instructions 821 may be executed by the controller to implement the operations of the ML monitor 21. A second set of instructions 822 may be executed by the controller to implement the operations of the prediction engine 22, including but not limited to operations used to implements the various embodiments of the models, algorithms, neural networks and/or other forms of AI implemented by the features of the ML growth predictor for generating growth prediction. A third set of instructions 823 may be executed by the controller to implement the instructions of the prioritization engine 23, including but not limited to the operations used to generate, rank and/or otherwise prioritize the scores as described herein.

In addition, system 800 may include a data storage device 830 (e.g., a database or other type of storage area) which may be used to store data and/or information generated by each of the forms of AI and for allowing the controller access to such information in order to generate the predictions, scores, and prioritization described herein. The data storage device 830 may also be used to store the time-series data received from the AML system 10 and output from the ML monitor 21.

The techniques used by criminals to launder money (e.g., to make illegally obtained money look like it was derived from legitimate revenue sources) in financial networks are very sophisticated, involving the use of malware, trojans, encryption, and other forms of complex data processing techniques. Because of the complexity, it is impossible to manually identify money laundering activity that might be operating within the financial network. That is why anti-money-laundering computer programs have been developed in attempt to determine this illegal activity. But these computer programs are concerned with past activity and do not in any way predict the growth of candidate ML networks that likely will occur in the future.

In accordance with one or more of the aforementioned embodiments, a system and method are provided for monitoring the growth of money laundering (MIL) networks, so that preemptive action may be taken to neutralize the network and prevent the predicted growth before the growth happens. The system and method may be implemented, for example, using one or more forms of artificial intelligence to predict which already-identified ML networks pose a high risk of growth during at least a foreseeable time in the future. For example, a prediction engine may be used to implement one or more artificial intelligence (or machine-learning) models to generate the predictions, and then a prioritization engine may be used to generate scores for identifying which of a plurality of candidate ML networks are likely to pose high growth risks.

These embodiments allow for the identification of NIL networks that are likely to be high risk before those networks grow or at least during an early stage of their growth. Such predictions could not be performed manually without the predictive prioritization described herein. In some cases, the disclosed embodiments may provide additional features and/or functionality to MITS (or to other products and systems) which will help the customers of a financial institution to combat Money Laundering Networks more effectively. These embodiments may also reduce the time and expense to combat money laundering, mitigate money losses to the financial institutions and its customers, and help to effectively allocate resources of the financial institution The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, engines, generators, predictors, scorers, monitors, and other signal generating and signal processing features of the embodiments described herein may be implemented in non-transitory logic which, for example, may include hardware, software, or both. When implemented at least partially in hardware, the controllers, processors, engines, generators, predictors, scorers, monitors, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, engines, generators, predictors, scorers, monitors, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Although a number of illustrative embodiments are described herein, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art. The embodiments may be combined to form additional embodiments.

We claim:

1. A growth predictor system, comprising:
a monitor configured to receive or generate first information of a network already identified as a candidate money laundering (ML) network by an anti-money-laundering system; a prediction engine having a feed-forward neural network that operates on the first information corresponding to growth of the network already identified as a candidate ML network and being configured to predict second information indicative of a growth size of the candidate ML network at a future time, the prediction engine to predict the second information based on the first information; and a prioritization engine configured to determine a priority of the candidate ML network based on the second information and to generate a score corresponding to the priority of the candidate ML network based on one or more predetermined criteria including predicted growth size, types of accounts, identity of account owners, numbers of transactions that currently exist and are predicted to take place in the ML network, types of transaction that currently exist and are predicted to take place in the ML network, the rate of growth predicted to occur, and the type of growth predicted to occur, the prediction engine to execute one or more predictive models to generate the second information indicative of the growth size of the candidate ML network at the future time, the first information indicating one or more graphical changes that have occurred in the candidate ML network over a past period of time, wherein: the first information includes spatio-temporal data on graphs corresponding to the one or more changes that have occurred in the candidate ML network over the past period; and one of the one or more the predictive models is configured to implement an encoder decoder long short-term memory (LSTM) network to predict the growth in size of the candidate ML network based on the first information.

2. The growth predictor system of claim 1, wherein each of the series of graphs includes: account nodes in a financial network that includes the candidate ML network; and one or more edges connecting two or more of the account nodes, each of the edges indicative of transactions occurring between or among the two or more account nodes.

3. The growth predictor system of claim 2, wherein each of the series of graphs includes information indicating an amount of money flow in the candidate ML network.

4. The growth predictor system of claim 2, wherein the growth in size includes a prediction of at least one of: an update to one or more of the account nodes; an update to the one or more edges; an addition of one or more new account nodes; or an addition of one or more new edges.

5. The growth predictor system of claim 1, wherein the predictive model is configured to implement one or more graph embedding algorithms to predict the growth in size of the candidate ML network based on the first information.

6. The growth predictor system of claim 1, wherein the predictive model is configured to implement a neural network to predict the growth in size of the candidate ML network based on the first information, and wherein the prioritization engine is additionally configured to automatically output an indication that the candidate ML network is a money-laundering network in which illegal activity is occurring based on the priority of the candidate ML network.

7. The growth predictor system of claim 1, wherein the prediction engine is configured to predict the growth size of the candidate ML network before the growth occurs and before confirmation of the ML network.

8. A method for managing a financial network, comprising: receiving or generating first information of a network already identified as a candidate money laundering (ML) network by an anti-money-laundering system; predicting, via a feed-forward neural network that operates on the first information corresponding to growth of the network already identified as a candidate ML network, second information indicative of a growth size of the ML network at a future time based on the first information; and
determining a priority of the candidate ML network based on the second information, generating a score corresponding to the priority of the candidate ML network based on one or more predetermined criteria including predicted growth size, types of accounts, identity of account owners, numbers of transactions that currently exist and are predicted to take place in the ML network, types of transaction that currently exist and are predicted to take place in the ML network, the rate of growth predicted to occur, and the type of growth predicted to occur, wherein said predicting includes executing one or more predictive models to generate the second information indicative of the growth size of the ML network at the future time, the first information indicating one or more graphical changes that have occurred in the candidate ML network over a past period of time, and wherein: the first information includes spatio-temporal data on graphs corresponding to the one or more changes that have occurred in the candidate ML network over the past period; and one of the one or more the predictive models is configured to implement an encoder decoder long short-term memory (LSTM} network to predict the growth in size of the candidate ML network based on the first information.

9. The method of claim 8, wherein each of the series of graphs includes: account nodes in a financial network that includes the candidate ML network; and one or more edges connecting two or more of the account nodes, each of the edges indicative of transactions occurring between or among the two or more account nodes.

10. The method of claim 9, wherein each of the series of graphs includes information indicating an amount of money flow in the candidate ML network.

11. The method of claim 9, wherein the growth in size includes a prediction of at least one of: an update to one or more of the account nodes; an update to the one or more edges; an addition of one or more new account nodes; or an addition of one or more new edges.

12. The method of claim 8, wherein the predictive model is configured to implement one or more graph embedding algorithms to predict the growth in size of the candidate ML network based on the first information.

13. The method of claim 8, further comprising: automatically outputting an indication, wherein the predictive model is configured to implement a neural network to predict the growth in size of the candidate ML network based on the first information, and wherein the indication indicates that the candidate ML network is a money-laundering network in which illegal activity is occurring.

14. The method of claim 8, wherein said predicting includes predicting the growth size of the candidate ML network before the growth occurs and before confirmation of the ML network.

* * * * *